Patented Jan. 18, 1949

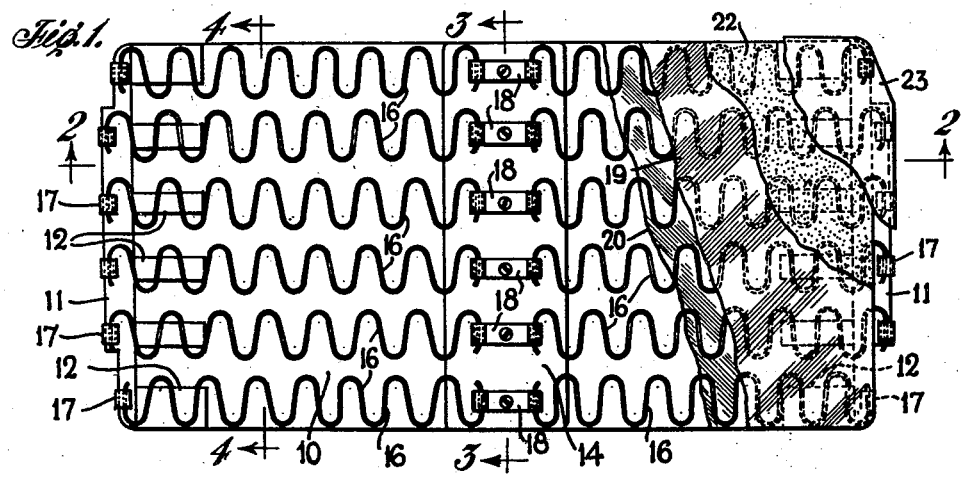
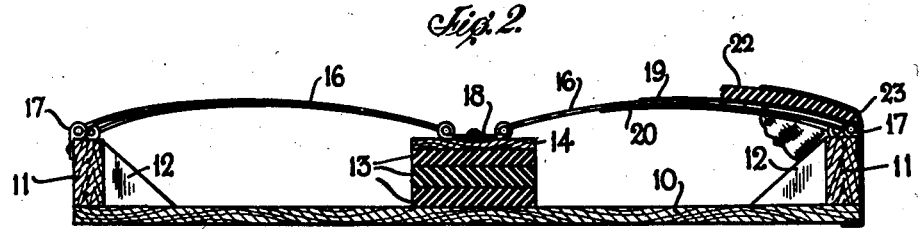
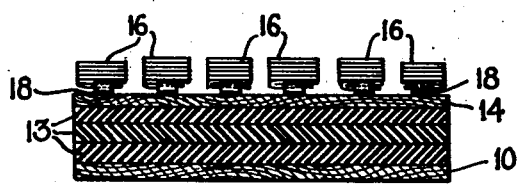
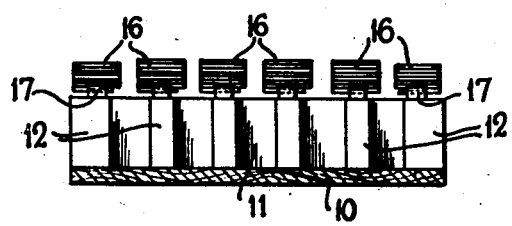
INVENTOR
HYLAND C. FLINT

2,459,755

UNITED STATES PATENT OFFICE 2,459,755

SEAT CUSHION, MULTIPLE TYPE

Hyland C. Flint, Akron, Ohio, assignor to The Firestone Tire & Rubber Company, Akron, Ohio, a corporation of Ohio Application May 27, 1946, Serial No. 672,372

6 Claims. (Cl. 155—179)

This invention relates to seat cushions such as commonly are used in motor cars, busses, street cars, railway coaches and the like, and more especially it relates to seat cushions of multiple type, that is, cushions for supporting more than one person.

The seat cushion of the invention is of the type that employs as its primary supporting structure, a plurality of spring units such as constitute the subject matter of the Kaden Reissue Patent No. 21,263, issued November 14, 1939. Each spring unit of the Kaden type consists of a transversely flat structure made up of a single spring wire bent into a longitudinal succession of undulations or sinuosities, and arranged to be anchored at its respective ends. The spring unit is tempered while longitudinally coiled in a relatively tight coil, and is uncoiled so as to present an upwardly arched or bowed appearance when mounted for use. Due to its pre-loaded arcuate set, the spring unit strongly resists forces that tend to flatten it.

Seats employing spring units of the character mentioned require lateral spring-anchoring rails of substantial strength and rigidity to oppose the inward pull of the arcuate spring units, which pull is increased when load is imposed upon the seat, as when a person is seated thereon. The presence of the rigid lateral edges on the seat has been found not too disagreeable in ordinary single passenger seats where the passenger sits between the same, and a protective cover of resilient material, such as sponge or foamed rubber composition is positioned thereover. However, in two-passenger seats it is not practical to extend a single Kaden type spring over a distance sufficient to support two seat-occupants, so that in two-occupant seats a center-support for the spring units is necessary. In seat cushions heretofore provided, this center support has been fixed and unyielding, and even when overlaid with a substantial thickness of foamed rubber upholstery, has been uncomfortable to occupants of the seat. It is to the relief of this condition that this invention primarily is directed.

Accordingly, the chief objects of the invention are to provide a multiple type seat cushion employing Kaden type spring units that will be more comfortable than similar seats heretofore provided; that will have greater resilience than similar seats heretofore provided; and to provide a seat having equalizing properties so that a heavy occupant seated on one side of the seat cannot disturb the seating characteristics of the other side of the seat. Other objects will be manifest as the description proceeds.

Of the accompanying drawing:

Fig. 1 is a plan view of a cushioned seat structure embodying the invention, parts thereof being broken away to reveal underlying structure;

Fig. 2 is a section on the line 2—2 of Fig. 1;

Fig. 3 is a section on the line 3—3 of Fig. 1; and

Fig. 4 is a section on the line 4—4 of Fig. 1.

Referring to the drawing, there is shown a cushioned seat structure comprising a base or frame 10 of general oblong shape that has rails 11, 11 rising from opposite ends thereof, said frame being shown of wood construction, although other suitable material may be employed if desired. The rails 11 extend from front to rear of the frame, and are thicker (wider) in their medial regions than at opposite ends thereof. The rails 11 are reinforced by buttresses 12 that engage the confronting, inwardly facing sides thereof. Located upon the frame 10 and extending transversely thereof, midway between end rails 11, is a central pier comprising one or more layers 13 of resilient material surmounted by a facing or top 14 of wood or similar rigid material, the normal height of the pier to the top of facing 14 being substantially the same as the height of the rails 11. The resilient layers 13 preferably are composed of cellular rubber or rubber-like composition.

Spanning the space between the center pier and the respective end rails 11 are spring units 16, 16 of the Kaden type hereinbefore described. Said spring units are in parallelism, and are in alignment on opposite sides of the center pier, and so arranged that they are upwardly arched, that is, their convex sides are uppermost. For anchoring said spring units to the end rails, metal clips 17 are secured to the latter, said clips each formed with an eye or sleeve in which a terminal portion of a spring unit is swivelled. For securing the spring units 16 to the center pier, metal straps or clips 18 are attached to the top of the wood facing 14 of the latter, said straps each formed with a terminal eye or sleeve at opposite ends thereof, the terminal portion of a spring unit 16 being swivelled in each of said eyes or sleeves. The arrangement is such that the spring units 16 on opposite sides of the center pier are in opposition to each other, the facing 14 of the center pier actually floating due to the inherent tension in the spring units in their uncoiled condition. However, it would not be possible for the facing 14 to support any substantial load due to the relatively great leverage existing between the inner and outer terminals of the spring units, and it is for this reason that the yielding layers 13 of the center pier are provided, as presently will be more fully explained.

Because the end rails 11 are of greater width in their medial regions than at their ends, it is possible to space the medial clips 17 farther from the clips 18 than are the clips 17 at the front and rear margins of the seat structure. This makes it possible to employ spring units 16 of slightly shorter span at the front and rear of the seat structure, and thereby to achieve a rounding or arcuate contour of the seat-top from front to rear thereof, and a rounding of the corners of the seat.

In order to prevent the spring units 16 from spreading laterally relatively of each other when under load, said spring units are confined between upper and lower sheets 19, 20 respectively of textile material, said sheets being bonded to the springs of the units 16 and to each other in the spaces between the springs. For so bonding said sheet material, the confronting faces thereof may be coated with rubber composition, which composition may be vulcanized after the sheets are applied to the spring units.

The seat cushion has a protective pad 22 upon the entire top thereof, which pad covers both groups of spring units and the central pier therebetween. Said pad preferably is composed of molded cellular or foam rubber, and is retained in place by a textile cover 23 of burlap or other suitable material that is secured at its margins to the base or frame 10. It will be understood that the seat structure described may be upholstered in any suitable or desired manner according to the situation in which it is to be employed.

The invention provides a seat cushion that is comfortable when either one or two are seated thereon. Experience has shown that the resilient rubber layers 13 of the center pier have equalizing properties so that a heavy person may sit on one side of the seat without disturbing a light person seated on the other side, and the presence of the center pier will not be noticed by either person. However, the center pier is not as yielding as the spring-supported portions of the seat at each side thereof and a person occupying the medial region of the seat will be cognizant of this fact. His natural impulse will be to move over to a softer portion of the seat, thus providing space for another who may desire to share the seat.

The invention is of relatively simple construction, is comfortable in use, and achieves the other objects set out in the foregoing statement of objects.

Modification may be resorted to without departing from the spirit of the invention or the scope thereof as defined by the appended claims.

What is claimed is:

1. In a seat cushion of the character described, the combination of a seat frame, a series of parallel, transversely flat, upwardly arched spring units each attached at one of its ends to one end of said frame, a similar series of spring units attached to the opposite end of said frame, and a centrally positioned floating member to which the other ends of each of said series of spring units are attached.

2. A combination as defined in claim 1 including a resilient structure upon which said floating member rests.

3. A combination as defined in claim 1 wherein the spring units on one side of the floating member are arranged in opposition to the spring units on the opposite side thereof.

4. A combination as defined in claim 1 whereof the outermost spring units of each series are of shorter span than the remainder of the spring units.

5. In a seat cushion of the character described, the combination of a seat frame, a series of parallel transversely flat upwardly arched spring units each attached at one of its ends to one end of said frame, a similar series of spring units attached to the opposite end of said frame, centrally disposed clips connecting the spring units of one series to respective spring units of the other series, and a centrally disposed pier of yielding material located below said clips and yieldingly opposing downward deflection thereof.

6. A combination as defined in claim 5 including a protective pad of resilient material overlying both of the series of spring units and the clips and pier below the same.

HYLAND C. FLINT.

REFERENCES CITED

The following references are of record in the file of this patent:

UNITED STATES PATENTS

| Number | Name | Date |
|---|---|---|
| 2,207,054 | Freund | July 9, 1940 |
| 2,225,858 | Church | Dec. 24, 1940 |
| 2,259,534 | Reynolds et al. | Oct. 21, 1941 |
| 2,303,036 | Flint | Nov. 24, 1942 |
| 2,366,607 | Freeman | Jan. 2, 1945 |

FOREIGN PATENTS

| Number | Country | Date |
|---|---|---|
| 138,726 | Austria | Sept. 10, 1934 |